United States Patent
Pavic

(10) Patent No.: US 12,321,967 B2
(45) Date of Patent: Jun. 3, 2025

(54) DIGITAL ARTWORK CONTENT DIGITAL RIGHTS MANAGEMENT AND CONTENT DISTRIBUTION NETWORK

(71) Applicant: Boris Pavic, Alexandria (AU)

(72) Inventor: Boris Pavic, Alexandria (AU)

(*) Notice: Subject to any disclaimer, the term of this patent is extended or adjusted under 35 U.S.C. 154(b) by 272 days.

(21) Appl. No.: 17/905,451

(22) PCT Filed: Mar. 17, 2021

(86) PCT No.: PCT/AU2021/050235
§ 371 (c)(1),
(2) Date: Sep. 1, 2022

(87) PCT Pub. No.: WO2021/189098
PCT Pub. Date: Sep. 30, 2021

(65) Prior Publication Data
US 2023/0139678 A1    May 4, 2023

(30) Foreign Application Priority Data

Mar. 25, 2020 (AU) ............................... 2020900901

(51) Int. Cl.
*G06Q 30/02* (2023.01)
*G06F 21/10* (2013.01)
*G06Q 30/0283* (2023.01)

(52) U.S. Cl.
CPC ......... *G06Q 30/0278* (2013.01); *G06F 21/10* (2013.01); *G06F 21/1079* (2023.08); *G06Q 30/0283* (2013.01)

(58) Field of Classification Search
None
See application file for complete search history.

(56) References Cited

U.S. PATENT DOCUMENTS 6,236,971 B1 * 5/2001 Stefik .................... G06Q 30/04
375/E7.009
6,670,934 B1 * 12/2003 Muoio ............. H04N 21/43615
715/730

(Continued)

FOREIGN PATENT DOCUMENTS

KR     1867343 B1 *  7/2018 ........... G06Q 30/018
WO  WO-2005076147 A1 *  8/2005 ....... G06F 17/30017

(Continued)

OTHER PUBLICATIONS

Renato Iannella. "Digital Rights Management (DRM) Architectures." (Jun. 2001). Retrieved online Jul. 25, 2024. (Year: 2001).*

(Continued)

*Primary Examiner* — James A Reagan
(74) *Attorney, Agent, or Firm* — INNOVATION CAPITAL LAW GROUP, LLP; Vic Lin

(57) ABSTRACT

A digital artwork content digital rights management and content distribution network has a digital artwork edition database comprising digital artwork content, digital artwork edition data stored in relation to the digital artwork content, digital artwork edition data attributes comprising edition attributes and edition DRM attributes stored in relation to the digital artwork edition data. The network has a DRM control subsystem configured for monitoring checking out and checking in of the digital artwork edition instances and updating digital artwork edition usage attributes accordingly and the network is configured for reissuing further digital artwork editions for digital artwork content according to digital artwork edition usage attributes of digital artwork edition data attributes thereof.

20 Claims, 1 Drawing Sheet

(56) References Cited

U.S. PATENT DOCUMENTS

| | | | | |
|---|---|---|---|---|
| 8,606,684 B2* | 12/2013 | Bi | ............................ | G06F 21/10 |
| | | | | 705/37 |
| 8,621,651 B2* | 12/2013 | Yin | ..................... | G06F 21/1013 |
| | | | | 386/230 |
| 8,627,338 B2* | 1/2014 | Lee | ......................... | H04L 63/10 |
| | | | | 719/318 |
| 8,671,443 B2* | 3/2014 | Dagdeviren | ......... | G06F 21/1085 |
| | | | | 726/6 |
| 9,202,210 B2* | 12/2015 | Raines | ............. | H04N 21/41407 |
| 9,342,661 B2* | 5/2016 | Cholas | ....................... | H04L 9/32 |
| 9,465,923 B2* | 10/2016 | Shen | ........................ | G06F 21/10 |
| 10,339,281 B2* | 7/2019 | Cholas | .................. | H04L 63/102 |
| 11,159,851 B2* | 10/2021 | Stern | .................... | H04N 21/254 |
| 11,534,661 B2* | 12/2022 | Oren | .................. | G06Q 20/3672 |
| 11,609,972 B2* | 3/2023 | Cholas | ................... | H04L 63/08 |
| 2001/0008557 A1* | 7/2001 | Stefik | ....................... | G06F 16/40 |
| | | | | 705/58 |
| 2001/0010045 A1* | 7/2001 | Stefik | .................. | H04L 12/1485 |
| | | | | 705/52 |
| 2002/0169773 A1* | 11/2002 | Penrod | ................... | G06Q 30/02 |
| 2004/0059929 A1* | 3/2004 | Rodgers | .................. | G06F 21/10 |
| | | | | 713/193 |
| 2005/0149450 A1* | 7/2005 | Stefik | .................. | H04L 63/0807 |
| | | | | 375/E7.009 |
| 2005/0204405 A1* | 9/2005 | Wormington | .... | H04N 21/44204 |
| | | | | 713/189 |
| 2006/0139479 A1* | 6/2006 | Dicarlo | ................ | H04N 1/6033 |
| | | | | 348/370 |
| 2007/0156594 A1* | 7/2007 | McGucken | ........ | H04N 21/8355 |
| | | | | 705/50 |
| 2007/0174919 A1* | 7/2007 | Raines | ................... | H04N 5/913 |
| | | | | 726/27 |
| 2007/0255965 A1* | 11/2007 | McGucken | ............ | G06Q 30/08 |
| | | | | 713/193 |
| 2008/0101604 A1* | 5/2008 | Kocher | ............ | G11B 20/00659 |
| | | | | 380/210 |
| 2008/0133938 A1* | 6/2008 | Kocher | .............. | H04N 21/8358 |
| | | | | 713/193 |
| 2008/0172678 A1* | 7/2008 | Lee | ......................... | H04L 63/10 |
| | | | | 719/318 |
| 2009/0009600 A1* | 1/2009 | Butler | ................ | G06Q 30/0237 |
| | | | | 348/143 |
| 2009/0083541 A1* | 3/2009 | Levine | ............... | G06Q 30/0603 |
| | | | | 713/172 |
| 2011/0157417 A1* | 6/2011 | Wang | ..................... | H04N 23/74 |
| | | | | 348/229.1 |
| 2011/0167254 A1* | 7/2011 | Dagdeviren | ........ | G06F 21/1085 |
| | | | | 715/741 |
| 2011/0209224 A1* | 8/2011 | Gentile | ............... | H04L 12/1421 |
| | | | | 709/217 |
| 2011/0219229 A1* | 9/2011 | Cholas | ...................... | H04L 9/32 |
| | | | | 713/168 |
| 2012/0174150 A1* | 7/2012 | Reddy | .............. | H04N 21/41407 |
| | | | | 725/31 |
| 2012/0182276 A1* | 7/2012 | Kee | ........................ | H04N 23/88 |
| | | | | 345/207 |
| 2012/0253893 A1* | 10/2012 | Anbalagan | ......... | G06Q 30/0601 |
| | | | | 705/14.1 |
| 2013/0191928 A1* | 7/2013 | Yin | ..................... | G06F 21/1013 |
| | | | | 726/27 |
| 2013/0271438 A1* | 10/2013 | Aflatooni | ............. | G09G 3/3466 |
| | | | | 345/207 |
| 2014/0222607 A1* | 8/2014 | Drouin | ............... | G06Q 30/0643 |
| | | | | 705/26.25 |
| 2014/0232903 A1* | 8/2014 | Oshima | ................ | H04N 23/661 |
| | | | | 348/229.1 |
| 2014/0259180 A1* | 9/2014 | Shen | ........................ | G06F 21/10 |
| | | | | 726/27 |
| 2015/0271541 A1* | 9/2015 | Gonder | ............ | H04N 21/64322 |
| | | | | 725/25 |
| 2016/0111062 A1* | 4/2016 | Hicks | ................... | H04N 1/6088 |
| | | | | 345/589 |
| 2017/0046729 A1* | 2/2017 | Breslin | .............. | G06Q 30/0214 |
| 2017/0161702 A1* | 6/2017 | Wood | .................... | G06F 21/105 |
| 2018/0225729 A1* | 8/2018 | Li | ...................... | G06Q 30/0283 |
| 2019/0290965 A1* | 9/2019 | Oren | ...................... | G16H 20/30 |
| 2021/0097528 A1* | 4/2021 | Wang | ........................ | H04L 9/30 |
| 2021/0357489 A1* | 11/2021 | Tali | ..................... | G06F 16/2379 |
| 2022/0027345 A1* | 1/2022 | Wu | ........................ | H04L 9/50 |
| 2022/0040557 A1* | 2/2022 | Tran | ......................... | G06F 1/163 |
| 2022/0309491 A1* | 9/2022 | Shapiro | ................... | G06F 21/64 |

FOREIGN PATENT DOCUMENTS

| | | | | |
|---|---|---|---|---|
| WO | WO-2012116239 A2 * | 8/2012 | ............ | G06F 21/10 |
| WO | 2019232580 A1 | 12/2019 | | |

OTHER PUBLICATIONS https://www.researchgate.net.publication/33391833_Digital_Rights_Management_DRM_Architectures/link/5941d22da6fdcc13d688ce55/download?_tp=eyJjb250ZXh0Ijp7lmZpcnN0UGFnZSl6InB1Ymxp Y2F0aW9uliwicGFnZSl6InB1YmxpY2F0aW9ulbn19 (Year: 2001).*

Global Platform. "Improving Premium Content Protection with the Trusted Execution Environment." (Sep. 2015). Retrieved online Jul. 25, 2024. https://globalplatform.org/wp-content/uploads/2018/04/GlobalPlatform_Premium_Content_WhitePaper2015-1,pdf (Year: 2015).*

Feap, "The Data Reference Model Version 2.0." (Nov. 17, 2005). Retrieved online Jul. 25, 2024. https://obamawhitehouse.archive.gov/sites/default/files/omb/assets/egov_docs/DRM_2_0_Final.pdf (Year: 2005).*

Australian Search Report dated Feb. 15, 2019 from Australian Application No. 2018902060.

International Preliminary Report on Patentability dated Jul. 8, 2022 from PCT Application No. PCT/AU2021/050235, 25 pages.

International Search Report & Written Opinion dated Aug. 29, 2019 from PCT Application No. PCT/AU2019/050578.

International Search Report & Written Opinion dated Jun. 16, 2021 from PCT Application No. PCT/AU2021/050235, 9 pages.

International-type search report dated Jul. 2, 2020 from Australia Application No. 2020900901, 10 pages.

* cited by examiner

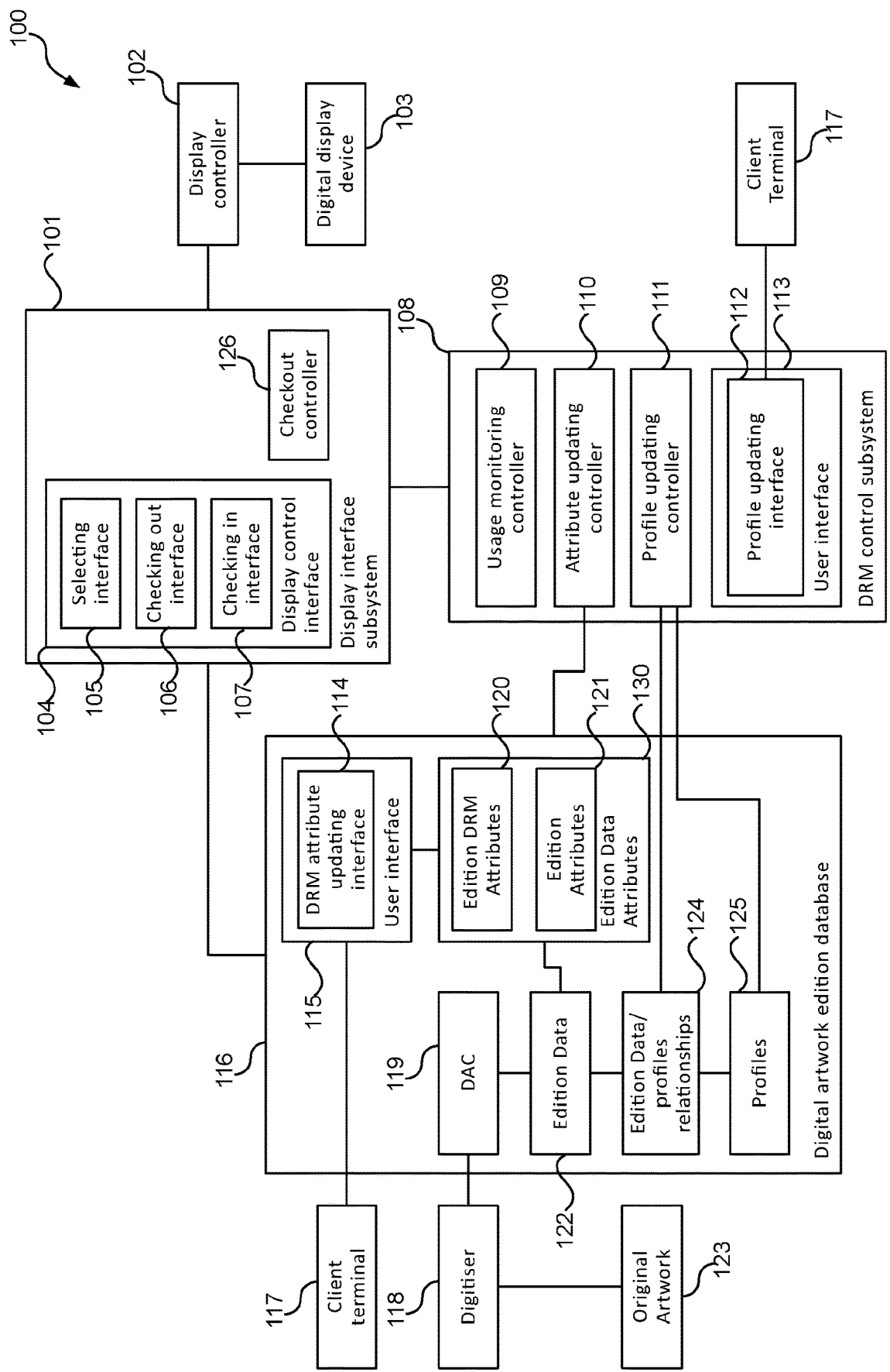

_US 12,321,967 B2_

DIGITAL ARTWORK CONTENT DIGITAL RIGHTS MANAGEMENT AND CONTENT DISTRIBUTION NETWORK

FIELD OF THE INVENTION

This invention relates generally to a digital artwork content digital rights management (DRM) and content distribution network.

BACKGROUND OF THE INVENTION

Various forms of file sharing and DRM control systems have been proposed including US 2012/0253893 A1 (ANBALAGAN et al) 4 Oct. 2012 which discloses a lending system which facilitates matching users that have a digital item to lend with users that wish to borrow a digital item. Each user has a reputation associated with his or her lending behaviour that is represented as a lending metric. The lending metric may show whether a given user is primarily a lender or borrower of digital items. Heavy borrowers that do not engage in commensurate lending may be penalized. Multiple users that lend and borrow digital items from one another may be connected in a social network. The nature of a relationship in the social network may and the lending metrics of users are factors used to make lending decisions.

US 2018/0225729 A1 (QUANTA COMPUTER INC.) 9 Aug. 2018 discloses peak-hour cost-based license management methods for use in a license management system that manages licenses and respective costs of using license. A cost management device calculates a cost of using a license corresponding to all the users currently using the licenses through the analyzed data obtained by the data analyzing device US 2017/0161702 A1 (RHAPSODY INTERNATIONAL INC.) 8 Jun. 2017 discloses generating a set of recommended media works based on an identified seed media work. The seed media work is used to identify a set of co-occurring media works, which are defined as media works that have been intentionally interacted with within a predetermined time window as the seed media work by a single user.

Whereas the present inventor has provided a system and methodology for the high-fidelity display of artwork images by way of related patent application PCT/AU2019/050578, the entire contents thereof which are incorporated herein by reference, there is a need for a way in which to distribute such high-fidelity artwork images across a content distribution network for display by electronic display devices and to optimise the distribution thereof.

It is to be understood that, if any prior art information is referred to herein, such reference does not constitute an admission that the information forms part of the common general knowledge in the art, in Australia or any other country.

SUMMARY OF THE DISCLOSURE

There is provided herein a digital artwork content digital rights management and content distribution network.

The network comprises a digital artwork edition database comprising digital artwork content, digital artwork edition data stored in relation to the digital artwork content, digital artwork edition data attributes comprising edition attributes and edition DRM attributes stored in relation to the digital artwork edition data, a digital artwork edition and DRM attribute updating interface, and user profiles stored in relation to the digital artwork edition data.

The network further has a display interface subsystem in operable communication with the digital artwork edition database; a plurality of digital display devices in operable communication with the display interface subsystem.

The display interface subsystem comprises a display control interface comprising a selection interface for selecting digital artwork content from the digital artwork edition database and a checking out interface for checking out of digital artwork content for display on digital display devices. The display interface subsystem comprises a checkout controller configured for controlling checking out and checking in of the digital artwork content in accordance with the digital artwork edition DRM attributes.

The network comprises a DRM control subsystem configured for monitoring checking out and checking in of the digital artwork content and updating digital artwork edition usage attributes accordingly.

The network is configured for reissuing further digital artwork editions for digital artwork content according to digital artwork edition usage attributes of digital artwork edition data attributes thereof.

The DRM control subsystem may be configured for reissuing digital artwork editions by closing an existing digital artwork edition by updating an edition status thereof, creating new digital artwork edition data representative of a new digital artwork edition; and associating the new digital artwork edition with the digital artwork content of the existing digital artwork edition.

Furthermore, the wherein the DRM control subsystem may be configured for setting or determining at least one of digital artwork edition size and digital artwork edition value of edition data attributes of the new digital artwork edition data.

As such, the network optimises delivery of digital artwork content according to digital artwork edition usage attributes thereof.

According to one aspect, there is provided a digital artwork content digital rights management and content distribution network comprising: a digital artwork edition database comprising: digital artwork content, digital artwork edition data stored in relation to the digital artwork content representative of digital artwork editions of the digital artwork content, digital artwork edition data attributes comprising edition attributes and edition DRM attributes stored in relation to the digital artwork edition data, a digital artwork edition and DRM attribute updating interface, and user profiles stored in relation to the digital artwork edition data; a display interface subsystem in operable communication with the digital artwork edition database; a plurality of digital display devices in operable communication with the display interface subsystem, wherein the display interface subsystem comprises: a display control interface comprising a selection interface for selecting digital artwork content from the digital artwork edition database and a checking out interface for checking out of digital artwork content for display on digital display devices and wherein the display interface subsystem comprises a checkout controller configured for controlling checking out and checking in of the digital artwork content in accordance with the digital artwork edition DRM attributes; and a DRM control subsystem configured for: monitoring checking out and checking in of the digital artwork content and updating digital artwork edition usage attributes accordingly, wherein: the network is configured for reissuing digital artwork editions of digital artwork content according to digital artwork edition usage attributes of digital artwork edition data attributes thereof.

The DRM control subsystem may be configured for reissuing digital artwork editions by: closing an existing digital artwork edition by updating an edition status thereof, creating new digital artwork edition data representative of a new digital artwork edition, associating the new digital artwork edition with the digital artwork content of the existing digital artwork edition; and determining edition data attributes of the new digital artwork edition according to the digital artwork edition usage attributes of the existing digital artwork edition.

The DRM control subsystem may be configured for setting at least one of digital artwork edition size and digital artwork edition value of edition data attributes of the new digital artwork edition data.

The DRM control subsystem may be configured for determining the artwork edition value wherein, for greater usage of a digital artwork edition indicated by the digital artwork edition usage attributes thereof, the greater the artwork edition value determined by the DRM control subsystem.

The DRM control subsystem may be configured for determining the artwork edition value wherein the DRM control subsystem may be configured for initially setting a high artwork edition value and lowering the artwork edition value until usage of the digital artwork edition indicated by the digital artwork edition usage attributes thereof exceeds a threshold.

The DRM control subsystem may be configured for setting at least one of edition instance rent value, edition instance purchase value, available edition instance limitation, maximum checkout limitation, user access limitation and geographical region limitation of the digital artwork edition DRM attributes of the new digital artwork edition data.

The DRM control subsystem may be configured for setting the at least one of edition instance rent value, edition instance purchase value, available edition instance limitation, maximum checkout limitation, of the digital artwork edition DRM attributes of the new digital artwork edition data according to the digital artwork edition usage attributes.

The DRM control subsystem may comprise a profile updating interface and profile updating controller configured for updating user profiles associated with the digital artwork edition data and updating user profiles according to the digital artwork edition usage attributes.

The digital artwork edition and DRM attribute updating interface may be configured for: creating digital artwork edition data; associating digital artwork content with the digital artwork edition data; setting digital artwork edition attributes; and setting digital artwork edition DRM attributes.

The digital artwork edition and DRM attribute updating interface may be configured for editing at least one of: digital artwork edition data; digital artwork edition attributes; and digital artwork edition DRM attributes.

The digital artwork edition value attributes of the digital artwork edition data attributes may comprise edition value, edition instance purchase value, and edition instance rental value.

The digital artwork edition usage attributes may comprise at least one of available edition instances and total edition checkouts of the edition DRM attributes.

In checking out digital artwork content, the network may be configured for decreasing an available edition instance limitation attribute of the edition DRM attributes thereof by one and increasing a total checkouts attribute of the edition DRM attributes thereof by one.

In checking in digital artwork content, the network may be configured for increasing an available edition instance limitation attribute of edition DRM attributes thereof by one.

The digital artwork edition DRM attribute data may comprise an available edition instances attribute and wherein the network may be configured for restricting checkouts if a number of checkouts of digital artwork content may be equal or greater than an available edition instances attribute thereof.

The DRM control subsystem may be configured for reissuing a digital artwork edition if an available edition instance attribute may be less than one.

The digital artwork edition DRM attribute data may comprise a digital artwork edition maximum checkout limitation attribute and wherein the network may be configured for restricting checkouts if a number of checkouts of digital artwork content equals the digital artwork edition maximum checkout limitation attribute.

The DRM control subsystem may be configured for reissuing a digital artwork edition if the number of checkouts thereof may be equal to or greater than a digital artwork edition maximum checkout limitation attribute thereof.

The edition DRM attribute data may comprise a geographic limitation DRM attribute and wherein the network may be configured for restricting checkouts for digital display devices in geographic regions according to the geographic limitation DRM attributes.

The edition DRM attributes data may comprise a maximum display duration limitation and wherein the network may be configured for automatically checking in digital artwork editions according to the maximum display duration limitation.

The edition DRM attribute data may comprise a user access limitation attribute and wherein the network may be configured for restricting checkouts for digital display devices according to the user access limitation.

When receiving a checkout request in relation to a digital display device, the network may be configured for cryptographically encrypting digital artwork content which can only be decrypted by the digital display device.

Cryptographically encrypted digital artwork content may be decrypted by a private key associated with the digital display device.

The digital artwork edition database may comprise edition data/profile relationship data relating the edition data and the profile data and wherein the network may be configured for updating the edition data/profile relationship data.

In updating the edition data/profile relationship data, the network may be configured for associating a new user profile with the edition data.

In updating the edition data/profile relationship data, the network may be configured for removing an existing user profile associated with the edition data.

In updating the edition data/profile relationship data, the profile updating interface may be configured for displaying the digital artwork edition value attribute and wherein the network may be configured for at least one of allocating credit/debit to the to the user profiles financial accounts and initiating an electronic financial transaction.

In updating the edition data/profile relationship data, the network may be configured for reissuing the edition in relation to the new user profile.

The selection interface may be configured for displaying the digital artwork edition instance rent value attribute and the digital artwork edition instance purchase value attribute and wherein the network may be configured for updating the user profiles data including at least one of allocating credit to financial accounts of the edition owner profile, allocating debit to financial accounts of the end user profile and initiating an electronic financial transaction.

In updating the user profiles data, the network may be configured for associating the rented edition instance with the end user profile.

In updating the user profiles data, the network may be configured for associating the purchased edition instance with the end user profile.

In updating the user profiles data, the network may be configured for updating the end user profile data according to the checked-out edition data attributes.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a digital artwork content digital rights management and content distribution network in accordance with an embodiment.

DESCRIPTION OF EMBODIMENTS

A digital artwork content digital rights management (DRM) and content distribution network 100 comprises a plurality of computing devices including client terminals 117, digital display devices 103 and servers in operable communication with each other across a wide area network such as the Internet.

Each computing device may comprise a processor for processing digital data and be in operable communication with a memory device across a system bus thereof. The memory device may be configured for storing digital data including computer program code instructions and associated data. As such, in use, the processor fetches these computer program code instructions and associated data from the memory device for interpretation and execution of the computational functionality described herein.

Whereas various configurations of computer network topologies may be employed, the network 100 comprises a digital artwork edition database 116, a display interface subsystem 101 in operable communication with the digital artwork edition database 116 and a DRM control subsystem 108, and the DRM control subsystem 108 in operable communication with the display interface subsystem 101 and the digital artwork edition database 116.

The database 116 comprises digital artwork content 119. The digital artwork content 119 may be digitised artwork image data digitised by a digitiser 118 from original artwork 123.

The digital artwork content 119 may comprise a digital image, meta data (such as author, name, artwork categorisation, tonal curves and the like) and an electronic certificate of authenticity. In embodiments, content of other file formats may be employed, including textual, audio and video content for digitised books, music and movies respectively.

The database 116 further comprises digital artwork edition data 122 stored in relation to the digital artwork content 119.

In embodiments, an edition may comprise a plurality of digital artwork content 119. The edition data 122 may specify an edition name and an edition type.

The edition type may comprise edition types including an artwork edition type which is created by the network 100 (not by users thereof) comprising singular digitalised artwork content, a playlist edition type which is created by an end user comprising a selection of edition instances, and an exhibition edition type which may be created by a curator type user comprising a plurality of editions of the artwork edition type.

For example, for the artwork edition type, the network 100 may create an edition by setting an edition name, associating a digital artwork content 119, setting an edition size, edition value, an edition status to public, geographic region limitations if any and user access limitations if any. Furthermore, the network 100 may set an edition certificate of rights, maximum display duration limitation, a checkout counter, available edition instances according to the edition size, a maximum checkout limitation being the total number of checkouts plus a value such as, for example, 200 checkouts per edition, an edition instance rental value and an edition instance purchase value.

For the playlist edition type, an end user may create a playlist of a selection of edition instances. For example, a user may select six edition instances for rent and assign a name for the playlist, optional playlist meta data, digital artwork content cycling time and display order. As such, the network 100 would accordingly set the edition type to playlist, edition status such as private, edition name being a value as specified by a user, edition digital artwork content collection as defined by the user, edition meta data as defined by the user and digital artwork content collection items information such as names, authors and other meta data derived from the digital artwork content 119.

The system may further set the edition DRM attributes 120 such as by setting an edition size (which may be initially set to 1 by default), digital artwork content cycling time (to, for example, 30 minutes or based on user choice), edition instance rental value (which may be calculated by summarising the user selected edition instance rental values derived from each selected edition instance of each respective edition DRM attributes 120) and user access limitation to allow the access to the playlist only to the user who created the playlist edition.

For the exhibition edition type, a curator type user can select a plurality of artwork edition type data items 122. For example, a curator type user can select 20 artwork edition data type items 122, assign a name for the exhibition, set exhibition meta data (an exhibition collateral), set a digital artwork content cycling time and display order, set the edition value, user access and geographic limitation if any. The network 100 would accordingly set the edition type to exhibition, the edition status to private or available for distribution as set by the curator type user or public as set by the network 100, the edition name and the edition value as defined by the curator type user, the edition digital artwork content collection representing the digital artwork content 119 items therein, edition meta data as defined by the curator type user, digital artwork content collection meta data, such as digital artwork content 119 name, author and other meta data. The curator type user or network 100 may further set the edition attributes 121 and edition DRM attributes 120 by setting the edition size to, for example, 500, edition instance rental value (which may be determined by the network 100 in accordance with the edition value and the edition size).

The database 116 comprises edition data attributes 130 comprising digital artwork edition DRM attributes 120 and digital artwork edition attributes 121 stored in relation to the digital artwork edition data 122.

In embodiments, the digital artwork edition attributes 121 may comprise digital artwork content collection information, edition size, edition status, edition meta data, edition value, edition certificate of rights and edition usage statistics.

The edition DRM attributes 120 may comprise a maximum display duration limitation, an available edition instances limitation, a total number of checkouts, a maximum checkout number limitation, edition instance rental value, edition instance purchase value, geographic region limitations, user access limitations and digital artwork content cycling time limitations.

The database 116 may further comprise a plurality of user profiles 125 related by digital artwork edition data/profile relationships 124 to the digital artwork edition data 122. The user profiles 125 may store user account information, user type information and user profile relationship information. The user account information may comprise user personal information, user geographic region information, user financial accounts, user subscription information, user display devices information, record of edition instances rented, record of edition instances purchased, and record of edition owned. The user type information may comprise user preferences, user usage statistics and user type which may include end user, edition owner and curator. The user profile relationship information may include information about the user's relationships with other users.

The database 116 may comprise a user interface 115 which may be configured to create and/or update edition data 122 and which comprise an edition and DRM attribute updating interface 114 accessible by a client terminal 117 for updating the digital artwork edition attributes 121 and DRM attributes 120.

The network 100 comprises a plurality of digital display devices 103 in operable communication with the display interface subsystem 101 via a display controller 102 for the display of edition instances of digital artwork content 119 thereon.

The display interface subsystem 101 may comprise a display control interface 104 comprising a selection interface 105 for the selection of digital artwork content for display, a checking out interface 106 for checking out of edition instance of digital artwork content for display on a digital display device 103.

The display interface subsystem 101 may comprise a checkout controller 126 for controlling the checking out and checking in of digital artwork edition instance in accordance with the digital artwork edition DRM attributes 120. Specifically, the checkout controller 126 may control the checking out of digital artwork edition instance in accordance with the number of available edition instances and/or any maximum checkout limitations specified by the edition DRM attributes 120.

The checkout controller 126 may limit the display of digital artwork content according to the edition DRM attributes 120, including geographical region limitations and user access limitations. The display controller 102 may display digital artwork content on the digital display device 103 in accordance with the digital artwork content cycling time and maximum display duration limitation of the edition DRM attributes 120.

The DRM control subsystem 108 may comprise a usage monitoring controller 109 which is configured for monitoring the checking out and checking in of digital artwork edition instances by the checkout controller 126 and deriving usage statistics therefrom. Usage statistics may comprise edition statistics and user statistics. Edition statistics may include the number of edition checkouts per time period, total and average display duration and the like. User statistics may include the number of edition instance checkouts by each user by type (such as rental or purchase), duration, edition type, edition value and number of edition purchases by time and value, and the like.

The DRM control subsystem 108 may comprise a profile updating controller 111 configured to update the record of edition instance rented, record of edition instance purchased, record of editions purchased, the user preferences and user usage statistics of the user profiles 125 with usage statistics, derived by the usage monitoring controller 109.

The DRM control subsystem 108 further comprise an attribute updating controller 110 configured for updating digital artwork edition data attributes 130 in accordance with checking out and checking in data monitored by the usage monitoring controller 109. The attribute updating controller 110 may be configured for updating edition usage statistics of the edition attributes 121 and the total number of checkouts and the available number of edition instances of the edition DRM attributes 120.

The attribute updating controller 110 may also be configured for updating the edition value of the edition attributes 121 and/or the edition instance rental value and edition instance purchase value of the edition DRM attributes 120.

The DRM control subsystem 108 may further comprise a user interface 113 comprising a profile updating interface 112 therefor accessible via a client terminal 117 for updating the digital artwork edition data/profile relationships 124 within the digital artwork edition database 116 using the profile updating controller 111.

Exemplary utilisation of the network 100 will now be described with reference to one example which should not be construed as being limiting on the features and functionality of the network 100.

The digital artwork content 119 may be created by the network 100 using the digitiser 118, which may include a digital image of the original artwork 123, digital artwork content meta data (such as author, name, artwork categorisation, tonal curves and the like) and an electronic digital artwork content certificate of authenticity.

The digitised digital artwork content 119 may be uploaded to the digital artwork edition database 116 and a digital artwork edition thereof created and stored within the digital artwork edition data 122. Appropriate digital artwork edition attributes 121 thereof may be configured, such as artwork name, author name and other digital artwork content information. In embodiments, initial digital artwork edition data attributes 130 may be set. As alluded to above, an artwork edition type may be created by the network 100 and a playlist or exhibition edition types may be created by users of the network 100.

The edition owner may use the client terminal 117 to control the digital rights management thereof using the DRM attribute updating interface 114. For example, an artwork edition owner user profile type may use the client terminal 117 and user interface 114 to update the edition data attributes 130 including the edition DRM attributes 120 and edition attributes 121. Certain of these edition DRM attributes 120 and edition attributes 121 may be predetermined by the network 100 in accordance with the edition type and, in embodiments, only certain attributes may be set by an user, such as the digital artwork content collection information, edition status or edition meta data of the edition attributes 121 and/or the geographic region limitations, user access limitations or digital artwork content cycling time of the edition DRM attributes 120 and the like.

For example, the edition owner may specify that the digital artwork edition may be viewed by the specific group of end users within the North American region.

As such, the display interface subsystem 101 makes the digital artwork edition available across the network 100.

End users may use the display control interface 104 to browse for, select the digital artwork edition using the selection interface 105 and check out the digital artwork edition instance for display on the digital display device 103 using the checking out interface 106. The checkout interface 106 may be customised according to user geographic region information, user preferences and usage user statistics. Furthermore, end-users may rent and edition instance or purchase in edition instance. In this regard, the selection interface 105 may show an edition instance rental value or edition instance purchase value which may be dynamically calculated by the usage monitoring controller 109 and updated by the attribute updating controller 110.

In embodiments, the checkout controller 126 may monitor the total number of checkouts and number of available edition instances and, when reissue conditions are met (in that the total number of checkouts equals the maximum checkout limitation or the available edition instances equals zero, for example), the DRM control subsystem 108 may generate an edition reissue request which is performed by the attribute updating controller 110.

The attribute updating controller 110 may handle the edition reissue request by setting the edition status to closed and the maximum display duration limitation to a specific value (to seven days for example, to allow users with actively rented edition instance time to select a new edition), creating a new edition 122 with the same digitalised artwork content as the closed edition and the available edition instances is set to the closed edition size. Furthermore, in preferred embodiment, edition value, edition instance rental value and edition instance purchase value of the new edition may be updated according to edition usage. In alternative embodiments, edition value, edition instance rental value and edition instance purchase value of the new edition may be updated by the edition owner or by the system according to the independent authority recommendation and the like.

In embodiments, the checkout controller 126 may be configured for automatically checking the digital artwork edition instance back in when display duration thereof reaches the maximum display duration limitation DRM attribute. The checkout controller may automatically renew edition instance rental by default unless instructed to otherwise by an end user in which case the checkout controller 126 will automatically check out an edition after the edition instance was checked in due to maximum display duration was met.

In embodiment, when receiving a checkout request for a digital display device 103 of an end user, the network 100 may generate a cryptographically encrypted version of the digital artwork content 119 of the digital artwork edition particular to the requesting digital display device 103 such that only the requesting digital display device 103 or a display controller 102 associated therewith is able to decrypt the digital artwork content for display.

Each end user may pay a monthly subscription (which may be credited to the end user financial accounts) which may, for example, allow access to various functionality of the network 100 in accordance with user type including end user type which may be allowed to rent or buy an edition instance or create playlists for personal use thereof, art owner type users which may additionally be allowed to purchase, monetise and sell artwork editions and curator type users which may additionally be allowed to commercialise and sell exhibition editions.

The network 100 may automate financial transactions against financial accounts of these various types of users including charging end users for renting or purchasing an edition instance or charging owner type user for purchasing an edition, and for remunerating edition owner each time the edition instance is checked out or the edition is purchased.

The usage monitoring controller 109 may monitor the checking out and checking in of the digital artwork edition by various end-users and deriving the edition usage and user usage statistics as alluded to above.

The attribute updating controller 110 may update edition value, edition instance rent value and edition instance purchase value of the digital artwork edition data attributes 130 according to usage of the digital artwork edition.

For example, in an embodiment, the greater the usage of the digital artwork edition, the greater the value updated by the attribute updating controller 110.

In an alternative embodiment, the attribute updating controller 110 may set an initially high edition value, edition instance rent value and/or edition instance purchase value of the digital artwork edition data attributes 130 and lower these amounts until the usage of the digital artwork edition exceeds a threshold.

In preferred embodiment, this process is a part of the edition reissue process described above. In alternative embodiments, this process may be periodical or continuous. For example, every 24 hours, the attribute updating controller 110 may update the valuation attributes of the digital artwork edition data attributes 130 according to the usage of the digital artwork edition.

Using the profile updating interface 112, other users may wish to acquire rights to the digital artwork edition for the monetisation thereof across the network. These rights may be specified within the edition certificate of rights within the edition attributes 121 which may comprise rights to access and use the edition, rights to commercialise the edition across the network 100 including the right to sell edition, rights to rent or sell an edition instance and right to sublicense the above rights to other user profiles.

The profile updating interface 112 may display the digital artwork edition value thereof dynamically calculated by the attribute updating controller 110.

As such, other users are able to acquire sublicense rights to the digital artwork edition and purchase the digital artwork edition by initiating an electronic payment (or allocation of user profile credit) determined in accordance with the digital artwork edition value attribute.

In embodiments, the DRM control subsystem 108 may comprise an auction controller configured for displaying the determined digital artwork edition value and receiving bids in relation to the digital artwork edition wherein, upon expiry of an auction period, the auction controller is configured for selecting a user profile associated with a highest bid amount to acquire sublicense rights to the digital edition and purchase the digital artwork edition by completing a user profile credit allocation payment or electronic funds transfer payment for the bid amount.

When a sublicense or sale rights is acquired by another user, the profile updating controller 111 updates the digital artwork edition data/profile relationships 124 within the digital artwork edition database 116 and generates the edition reissue request to be handled by the attribute updating controller as alluded above.

A new sublicensee/edition owner associated with the reissued digital artwork edition is therefore able to configure the same or a separate set of digital artwork edition attributes 121 or edition DRM attributes 120 in relation to the reissued digital artwork edition to distribute and monetise the digital artwork edition across the network 100.

For example, a new sublicensee user may be able to use the edition and DRM attribute updating interface 114 to define DRM limitations for the reissued digital artwork edition for display in Australia by up to 50 users simultaneously. As such, in the aforedescribed manner, the network 100 may monitor the usage of the reissued artwork edition and allocate credit and/or initiate electronic financial transactions in favour of the new sublicensee user according to the usage patterns within Australia.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A digital artwork content digital rights management and content distribution network comprising:
   a digital artwork edition database comprising:
      digital artwork content,
      digital artwork edition data representative of digital artwork editions of at least one of the digital artwork content and further digital artwork editions,
      digital artwork edition data attributes comprising edition attributes and edition DRM attributes stored in relation to the digital artwork edition data, the edition attributes including digital artwork edition usage attributes, including at least one of available edition instances and total edition checkouts,
      a digital artwork edition and DRM attribute updating interface, and
      user profiles stored in relation to the digital artwork edition data;
   a display interface subsystem in operable communication with the digital artwork edition database;
   a plurality of digital display devices in operable communication with the display interface subsystem,
   wherein the display interface subsystem comprises:
      a display control interface comprising a selection interface for selecting digital artwork edition from the digital artwork edition database; and
      a checking out interface for checking out of digital artwork edition instances for simultaneous display thereof on a plurality of digital display devices and wherein the display interface subsystem comprises a checkout controller configured for controlling simultaneous checking out and checking in of the digital artwork edition instances in accordance with the digital artwork edition DRM attributes; and
   a DRM control subsystem configured for:
      monitoring checking out and checking in of the digital artwork edition instances and updating the digital artwork edition usage attributes accordingly;
      requesting reissuing further digital artwork editions with adjusted digital artwork edition data attributes, including adjusted DRM attributes, according to digital artwork edition usage attributes thereof when a total number of checking out equals a maximum checkout limitation or when available edition instances equals zero, wherein the reissuing results in closing a current edition having the digital artwork content and establishing the further artwork edition for the digital artwork content; and
      adjusting a maximum display duration limitation of digital artwork edition data attributes of any checked out digital artwork edition instances thereof of the closed current edition to permit users to select the further artwork edition for the digital artwork content.

2. A network as claimed in claim 1, wherein the DRM control subsystem is further configured for reissuing a digital artwork edition by:
   closing the digital artwork edition by updating an edition status thereof,
   creating a new digital artwork edition,
   associating the new digital artwork edition with digital artwork content of the digital artwork edition; and
   setting edition data attributes of the new digital artwork edition according to the digital artwork edition usage attributes of the digital artwork edition.

3. A network as claimed in claim 2, wherein the DRM control subsystem is configured for determining and setting the at least one of the digital artwork edition size, digital artwork edition value, edition instance rent value, edition instance purchase value, available edition instance limitation and maximum checkout limitation of the digital artwork edition DRM attributes of the new digital artwork edition data according to the digital artwork edition usage attributes.

4. A network as claimed in claim 3, wherein the DRM control subsystem is configured for determining the artwork edition value wherein, for greater usage of a digital artwork edition indicated by the digital artwork edition usage attributes thereof, the greater the artwork edition value determined by the DRM control subsystem.

5. A network as claimed in claim 3, wherein the DRM control subsystem is configured for determining the artwork edition value wherein the DRM control subsystem is configured for initially setting a high artwork edition value and lowering the artwork edition value until usage of the digital artwork edition indicated by the digital artwork edition usage attributes thereof exceeds a threshold.

6. A network as claimed in claim 1, wherein the DRM control subsystem comprises a profile updating interface and profile updating controller configured for updating user profiles associated with the digital artwork edition data and updating user profiles according to the digital artwork edition usage attributes.

7. A network as claimed in claim 1, further comprising a digital artwork edition and DRM attribute updating interface configured for:
   creating digital artwork edition data;

associating at least one of digital artwork content and digital artwork edition with the digital artwork edition data;

setting digital artwork edition attributes; and setting digital artwork edition DRM attributes.

8. A network as claimed in claim 1, further comprising a digital artwork edition and DRM attribute updating interface configured for editing at least one of:

digital artwork edition data;

digital artwork edition attributes; and digital artwork edition DRM attributes.

9. A network as claimed in claim 1, wherein the digital artwork edition usage attributes comprise at least one of available edition instances and total edition checkouts of the edition DRM attributes and wherein, when checking out a digital artwork edition instance, the network is configured for decreasing an available edition instance limitation attribute of edition DRM attributes thereof by one and increasing a total checkouts attribute of the edition DRM attributes thereof by one; and when checking in a digital artwork edition instance, the network is configured for increasing an available edition instance limitation attribute of edition DRM attributes thereof by one.

10. A network as claimed in claim 1, wherein the DRM attributes comprises an available edition instances attribute and wherein the network is configured for restricting checkouts if a number of checkouts of digital artwork edition instances is equal or greater than an available edition instances attribute thereof, and wherein the DRM control subsystem is configured for reissuing a digital artwork edition if an available edition instance attribute is less than one.

11. A network as claimed in claim 1, wherein the DRM attributes comprise a digital artwork edition maximum checkout limitation attribute and wherein the network is configured for restricting checkouts if a number of checkouts of a digital artwork edition instance equals the digital artwork edition maximum checkout limitation attribute, and wherein the DRM control subsystem is configured for reissuing a digital artwork edition if the number of checkouts thereof is equal to or greater than a digital artwork edition maximum checkout limitation attribute thereof.

12. A network as claimed in claim 1, wherein the DRM attributes comprises a geographic limitation DRM attribute and wherein the network is configured for restricting checkouts for digital display devices in geographic regions according to the geographic limitation DRM attributes.

13. A network as claimed in claim 1, wherein the DRM attributes further comprise a user edition instance renewal preference, and wherein the network is configured for automatically checking in a digital artwork edition instance according to a maximum display duration limitation thereof and automatically checking out a digital artwork edition instance according to a user edition instance renewal preference thereof.

14. A network as claimed in claim 1, wherein the DRM attributes comprises a user access limitation attribute and wherein the network is configured for restricting checkouts for digital display devices according to the user access limitation.

15. A network as claimed in claim 1, wherein, when receiving a checkout request in relation to a digital display device, the network is configured for cryptographically encrypting digital artwork content which can be decrypted using a private key associated with the digital display device.

16. A network as claimed in claim 1, wherein the digital artwork edition database comprises edition data/profile relationship data relating the edition data and profile data and wherein the network is configured for updating the edition data/profile relationship data including associating a new user profile with the edition data and disassociating an existing user profile with the edition data.

17. A network as claimed in claim 16, wherein, in updating the edition data/profile relationship data, the profile updating interface is configured for displaying the digital artwork edition value attribute and wherein the network is configured for at least one of allocating credit/debit to the to the user profiles financial accounts and initiating an electronic financial transaction.

18. A network as claimed in claim 16, wherein, in updating the edition data/profile relationship data, the network is configured for reissuing the edition in relation to the new user profile.

19. A network as claimed in claim 1, wherein the selection interface is configured for displaying the digital artwork edition instance rent value attribute and the digital artwork edition instance purchase value attribute and wherein the network is configured for updating the user profile data including at least one of allocating credit to financial accounts of the edition owner profile, allocating debit to financial accounts of the end user profile and initiating an electronic financial transaction.

20. A network as claimed in claim 19, wherein, in updating the user profile data, the network is configured for at least one of associating the rented edition instance with the end user profile;

associating the purchased edition instance with the end user profile; and updating the end user profile data according to the checked-out edition data attributes.

* * * * *